Feb. 2, 1965 A. J. KLOSE 3,167,955
PITCH AND YAW INDICATOR AND THE LIKE
Filed April 11, 1961
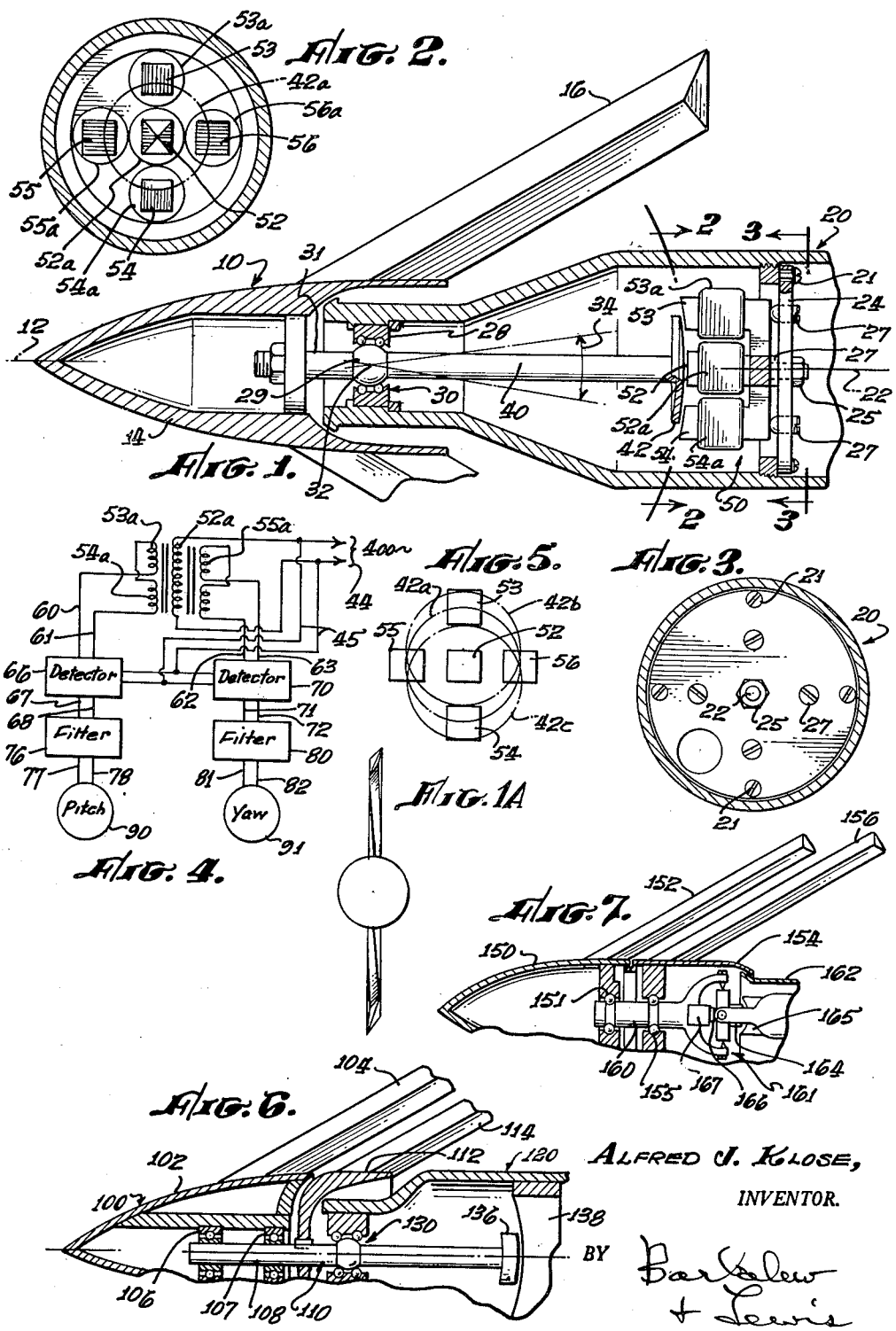
ALFRED J. KLOSE,
INVENTOR.

United States Patent Office 3,167,955
Patented Feb. 2, 1965

3,167,955
PITCH AND YAW INDICATOR AND THE LIKE
Alfred J. Klose, Pasadena, Calif., assignor to Giannini Controls Corporation, Inc., Duarte, Calif., a corporation of New York
Filed Apr. 11, 1961, Ser. No. 102,247
4 Claims. (Cl. 73—180)

This invention is concerned with means for indicating the direction of flow of a fluid stream. It is particularly useful in an instrument for indicating the direction of air flow relative to an aircraft or other vehicle, and may be embodied in an angle of attack indicator or a pitch and yaw indicator.

Instruments for indicating pitch and yaw of a aircraft, for example, frequently comprise an aero head mounted on a support for universal swinging movement and carrying vane structure for orienting the head in alignment with the air stream. Output means of various types may be provided for developing one or more signals that represent the orientation of the head, and hence of the air stream, relative to the support. Such output means may, for example, produce one signal respresenting the angle of pitch and another signal representing the angle of yaw.

A disadvantage in such previous devices has been the necessity for calibrating each instrument, since the mechanical axis of the aero head does not always correspond accurately to the true direction of the air stream. Any slight lack of symmetry in the head, in its mounting, or in the vane structure may cause an error in the effective alignment of the head. And even after careful calibration to determine the actual effective axis of the head, and corresponding correction of the output mechanism, any slight injury to the vane structure may change the aerodynamic properties of the head and hence require repetition of the entire calibration procedure. Since the vane structure is necessarily relatively fragile and is exposed to accidental injury from many sources, continuous maintenance time and expense have been required to insure that previously available instruments were performing accurately.

In accordance with the present invention, that difficulty is avoided by making the output signal effectively independent of the detailed condition of symmetry of the aero head. That is accomplished by causing the vane structure, and preferably the entire aero head, to rotate about its longitudinal axis. Any lack of symmetry that displaces the effective axis of the head from the mechanical axis then tends to cause deviation of the output signal first in one direction and then in the other. Hence, the mean value of that signal, averaged over a period long compared to the period of rotation, is substantially unaffected by the lack of symmetry.

In preferred form of the invention, the head member is mounted on the support in a manner that not only permits the usual swinging movement of the head axis through a solid angle with respect to the support, but also permits substantially free rotation of the entire head about its longitudinal axis. For example, the head may be mounted on the support by means of a ball-bearing of self-aligning type, the bearing being coaxial with the head in zero position of the latter and permitting substantially free head rotation about its own axis. The self-aligning property of the bearing then permits limited swinging movement of the head axis with respect to the support.

Means are provided for developing an output signal that represents the angular position of the head axis, that signal preferably varying with the average position of the axis and being substantially independent of any variations of the axis position that occur at the frequency of the vane rotation. Such an output signal may be developed in many different ways. For example, an initial electrical signal may be developed that continuously represents the position of the head axis, and the frequency component of the signal that corresponds to the vane rotation may then be filtered out by means of an electrical low pass circuit to produce a signal representing the average position of the head axis. Alternatively, for example, such an initial signal may be averaged in any suitable manner to produce the desired output signal. In practice, that filtering or averaging process is only required to remove a relatively small portion of the total initial signal, and may typically be accomplished with relatively simple instrumentation.

In accordance with another aspect of the invention, the head may comprise an element that does not rotate about the longitudinal axis, but is capable of swinging movement with respect to the support. For example, that element, which may be designated as the head frame, may be mounted on the support by means of a conventional universal joint. The vanes are then related to the head frame by means of a bearing which permits relative rotation about their common longitudinal axis. That bearing is preferably of a type which maintains the longitudinal axes of the vanes and frame in accurate alignment. Signal generating means of any suitable type may then be actuated by the relative swinging movement of the frame and support.

A full understanding of the invention and of its further objects and advantages will be had from the following description of certain illustrative manners in which it can be carried out, of which description the accompanying drawings form a part. That description is intended only as illustration, and many modifications can be made in the particular embodiments herein described without departing from the scope of the invention, which is defined by the appended claims.

In the drawings:
FIG. 1 is an axial section representing, partly schematically, an illustrative embodiment of the invention;
FIG. 1A is a schematic rear view at reduced scale;
FIG. 2 is a transverse section on line 2—2 of FIG. 1;
FIG. 3 is a transverse section on line 3—3 of FIG 1;
FIG. 4 is a schematic electrical diagram illustrating the invention;
FIG. 5 is a schematic diagram corresponding to FIG. 2;
FIG. 6 is an axial section representing another illustrative embodiment; and
FIG. 7 is an axial section representing a third illustrative embodiment.

In FIG. 1 an illustrative aero-head in accordance with one aspect of the invention is indicated generally by the number 10, and is mounted on a support 20. That support may typically comprise a straight hollow mast having a longitudinal axis 22 and being adapted to be fixedly mounted on an aircraft in such forwardly projecting position that during normal flight it is approximately aligned with the air stream. Support 20, only the forward portion of which is shown, carries coaxially at its forward end the outer race 28 of a self-aligning ball bearing 30. The inner race 29 of bearing 30 is of spherical form and carries head 10 in coaxial relation by means of the supporting post 31. The aero head is thus enabled to rotate freely about its longitudinal axis, indicated at 12, which is normally substantially parallel to the axis of bearing 30. The head is also enabled to swing about any transverse axis through the central point 32 of the bearing, describing a solid angle indicated at 34. That angle may typically have any desired value permitted by the self-aligning nature of the ball bearing, from a few degrees to as much as 20 or 30 degrees, depending upon the type of service contemplated. The particular mounting shown is illustrative of the many known types of bearing that afford substantially free rotation about an axis as well as universal-swinging of that axis through at least a limited solid angle.

Aero head 10 comprises a body portion 14, preferably formed as a faired enclosure for bearing 30, and suitable structure for aligning the head with the air stream and for developing a torque about longitudinal axis 12. That structure may conveniently comprise vanes, as illustratively shown at 16, which extend obliquely outwardly and rearwardly from body portion 14, and which lie substantially in respective axial planes. However, in accordance with the present invention at least a portion of that vane structure is somewhat helical in form, so that the passing air exerts upon the vanes a torque about axis 12. In the present embodiment that torque causes the entire aero head to spin continuously about its longitudinal axis. The frequency of that rotary motion imparted to the vanes and head is roughlhy proportional to the velocity of the air stream. For a given air stream velocity the spin frequency may be controlled by forming the vanes with a helical twist of suitable pitch as illustrated schematically in FIG. 1A. The center of gravity of head 10 is preferably located at the central point 32 of bearing 30.

Suitable output mechanism is provided for developing an output signal of the desired type. That signal typically is dual in nature, the two signal components representing the average angular position of head axis 12 in vertical and horizontal axial planes, respectively. Those signal components then correspond to angles of pitch and yaw of the aircraft. As shown, an arm 40 is rigidly mounted on head 10 and extends coaxially through the central bore of bearing 30 into the hollow interior of mast 20. Arm 40 carries at its end a suitable formation 42 adapted to cooperate with signal generating means on the mast, such means being indicated at 50. As shown, transducer means 50 comprises a double E-core transformer, having a central core arm 52 on the axis 22 of the mast and having two sets of outer core arms symmetrically arranged in respective axial planes that are perpendicular to each other. The two outer arms 53 and 54 lie in the plane of FIG. 1, and the outer arms 55 and 56 of transformer 50 lie in the axial plane perpendicular to FIG. 1. Each arm of the transformer carries a winding, winding 52a of central arm 52 serving typically as the primary and being supplied with alternating current of suitable frequency, for example 400 cycles per second, from a suitable source 44. The windings 53a and 54a of the pair of arms 53 and 54 are connected in one output circuit 60, 61 in series opposition, as indicated in FIG. 4; and the windings 55a and 56a of the other pair of outer arms are similarly connected in another output circuit 62, 63. The end faces of all the arms preferably lie in a spherical surface, as indicated in FIG. 1, having its center at 32. Transformer 50 may be mounted in any suitable manner, as by an internal transverse mast wall 24 of non-magnetic material. As shown, the transformer core is mounted on wall 24 by a coaxial bolt and nut 25 with a spacing washer 26, and may be adjusted in angle by the four set screws 27. Wall 24 may be mounted in transversely adjustable position on internal mast flange 24a by means of screws 21. The described adjustments facilitates production of an accurate air gap between armature 42 and the transformer core pole faces.

Armature 42 on head arm 40 may comprise a coaxial cylindrical armature block of suitable ferro-magnetic material, preferably having high magnetic permeability. The end face of armature 42 is preferably spherical in form and is closely spaced from the spherical core faces, that spacing being exaggerated in the drawings for clarity of illustration. When head arm 40 and armature 42 are aligned with mast axis 22, which is normally the zero position of the instrument, armature 42 is related to the transformer core as indicated by the dot-dash line 42a in FIGS. 2 and 5, and forms magnetic circuits of equal reluctance with all of the respective outer arms of transformer core 50. The voltages induced in the four secondary windings of the transformer are therefore all equal, and since each output circuit includes two windings in opposition, the output signal voltages on lines 60, 61 and 62, 63 are both zero. The rotation of armature 42 about its axis due to spinning of the entire head does not affect that result.

On the other hand, if head axis 12 is deflected from mast axis 22 in a vertical plane, for example, corresponding to positive pitch of the aircraft, the relation of armature 42 to the transformer core is of the type shown in FIG. 5 at 42b. The reluctance of the magnetic circuit through transformer arm 53 is then less than that through arm 54, so that the voltage induced in secondary winding 53a exceeds that in winding 54a by an amount substantially proportional to the angle of pitch. The resulting pitch signal in lines 60, 61 is an alternating current voltage having definite phase relation to the primary voltage. Deflection of the head axis through the same angle but in the opposite direction produces an armature position such as 42c in FIG. 5, resulting in a pitch signal of the same amplitude but of opposite phase. Those two types of signal may readily be distinguished by means of a phase sensitive detector, which may be of any suitable type. Such a detector is indicated schematically in FIG. 4 at 66 in the pitch signal circuit and at 70 in the yaw signal circuit. The detectors are supplied with a reference phase signal via lines 45 from source 44 of transformer primary 50. The output signals from detectors 66 and 70 on lines 67, 68 and 71, 72, respectively, then comprise direct current signals of which the magnitude represents the pitch or yaw angle and the polarity represents the sign of the pitch or yaw. Those signals are not affected by spinning of the aero head provided that such spinning action causes armature 42 to revolve about its geometrical axis. Hence, when the entire head and vane structure has perfect symmetry, the armature rotation has no affect on the transformer action and the rectified output signal voltage is also independent of the rotation.

If the head or vane structure is not perfectly symmetrical, the effective axis about which the head actually spins may not coincide precisely with the geometrical axis of armature 42. The effective axis of spin of the head then represents the actual direction of the air stream, and the positon of armature 42 rotates about that axis at the spin frequency. For example, if pitch and yaw are both zero the effective axis of spin typically coincides with mast axis 22, but the armature position may rotate about that axis, occupying successive positions such as 42b and 42c in FIG. 5. The rectified pitch signal on lines 67, 68 is then substantially sinusoidal voltage that varies with the spin frequency about the mean value zero. The yaw signal on lines 71, 72 varies in the same manner, except that it is 90° out of phase with the pitch signal. If the pitch has a definite value different from zero, the pitch signal has a corresponding average value, varying sinusoidally about that value with the spin frequency and with an amplitude corresponding to the displacement of the effective spin axis from the geometrical axis of the armature. Since that displacement is ordinarily small, the alternating current component of the rectified signal is usually small compared to the direct current component.

The sinusoidal component of the signal voltages can readily be eliminated, for example by passing the signals through suitable filter networks, indicated schematically at 76 and 80 in FIG. 4, those filters being of any suitable type that greatly attenuates the spin frequency component of the signal and that passes all signals of appreciably different frequency with little or no attenuation. For example, filters 76 and 80 may comprise conventional low pass filter networks which attenuate frequency components equal to or greater than the spin frequency and pass with relatively little attenuation appreciably lower frequencies. The resulting output signals on lines 77, 78 and 81, 82 represent the actual pitch and yaw values and are substantially unaffected by the exact condition of symmetry of the aero head. Those output signals can then be utilized in any desired manner, for example, to operate a pitch and yaw indicating instrument, to control a warning device, or directly to control operation of the aircraft. Pitch and yaw indicating devices are shown illustratively at 90 and 91, respectively, and may comprise conventional meters responsive to direct current.

The final indicating or control device at 90 or 91 may be of a type that is inherently substantially or wholly insensitive to an alternating current voltage of the spin frequency, and may respond only to appreciably lower frequencies. The low pass filter, indicated at 76 or at 80, may then be considered to be incorporated in the final output device, and need not be provided as a distinct component of the system.

In the described embodiment of the invention, it is desirable that the effective pitch of vanes 16 be such that the spin velocity of head 10 is relatively low. Otherwise, the gyroscope action of the spinning head may delay accurate alignment of the spin axis with the direction of the air stream when the latter changes rapidly. A spin velocity of 10 to 20 revolutions per second is ordinarily satisfactory, producing only moderate precession forces and yet providing output signals from detectors 66 and 70 in which any alternating current component due to imperfect balance of the head is of sufficiently high frequency to permit effective filtering with filter networks 76 and 80 of conventional and economical design.

The precession forces may be substantially wholly compensated, if desired, permitting convenient use of higher spin velocities. For example, two sets of vanes may be provided, which rotate in opposite directions. The two sets of vanes are journaled with respect to each other by bearing means which maintain coaxial relation of their longitudinal axes. Means are then provided for mounting the vane units. The common axis of the vane units may be considered as the head axis. The head is then mounted on the support, typically a mast, in such a way as to permit swinging movement of the head axis with respect to the mast axis. That mounting means may comprise structures of various types. In particular, the mounting means may include a unified bearing structure which provides for both the swinging movement of the head axis and the spin movement of at least one of the vane units. Such a structure is shown illustratively in FIG. 6. Alternatively, the swinging movement of the head axis may be accommodated by a universal joint of any suitable type, acting between the mast and a head frame; and separate journal means may be provided to accommodate the vane spin. Such a structure is shown illustratively in FIG. 7.

In FIG. 6, the nose portion 102 of head 100 carries vanes 104 and is journaled by the bearings 106 and 107 on the post 108. That post comprises a forward portion of a rod 110, which is supported intermediate its length by the bearing 130 on the mast 120. Bearing 130 is similar to bearing 30 of FIG. 1, already described. A rearward head portion 112 carries a second set of vanes 114 and is fixedly mounted on rod 110 between bearing 130 and nose portion 102. The rearward portion of rod 110 carries means indicated at 136 adapted to cooperate with means 138 fixedly mounted on mast 120 to produce an output signal representing the angular position of the axis of rod 110 with respect to that of mast 120. Such output means may typically comprise an armature and transformer as shown at 42 and 50 of the figures previously described. The center of mass of the entire head assembly is preferably at the center of bearing 130. That may readily be accomplished, for example, by axial adjustment of a balancing mass 140 along rod 110.

Vanes 114 are formed with a slight helical twist which causes them and rod 110 to spin about their longitudinal axis in one direction; and vanes 104 are formed with an opposite helical twist which causes them and nose portion 102 to spin about the axis of bearings 106 and 107 in the opposite direction. The vanes act together to align the entire head assembly with the air stream, and the action of the device may be closely similar in many respects to that of FIGS. 1 to 5.

In the illustrative embodiment shown schematically in FIG. 7, nose body portion 150 and vanes 152 and rearward body portion 154 and vanes 156 are separately journaled coaxially by the bearings indicated at 151 and 155, respectively, on the head frame 160. Frame 160 is mounted on mast 162 by means of a universal joint 161, which may be of conventional type. Vanes 152 and 156 are arranged to spin in opposite directions with respect to head frame 160, which is restrained from spinning by universal joint structure 161. However, that structure permits swinging of the longitudinal axis of the head with respect to the mast axis. Output means may be of conventional type, utilizing relatively moving inductor elements indicated schematically at 164 and 165 to produce a pitch signal and corresponding elements 166 and 167 to produce a yaw signal. The resulting signals may be filtered in the manner already described to eliminate the alternating current component at the vane spin frequency which may result from imperfect alignment or balance of the head.

I claim:

1. Means responsive to the direction of a fluid stream, comprising a support, a head member having a head axis and being mounted on the support for swinging movement of the head axis with respect to the support, vane structure on the head member for energizing a fluid stream to align the head axis with the direction of the fluid stream, said vane structure developing a torque about the head axis by virtue of relative movement of the fluid stream, bearing means interposed between the vane structure and the support, to permit rotation of the vane structure with respect to the support about an axis substantially parallel to the head axis in response to said torque, and output means for developing a signal in response to variations of the angular position of the head axis.

2. Means responsive to the direction of a fluid stream, comprising a head member having a head axis, structure on the head member for engaging a fluid stream to align the head axis with the direction of the fluid stream, said structure exerting on the head a torque about the head axis by virtue of relative movement of the fluid stream, a support, means mounting the head member on the support for substantially free rotation about the head axis and for universal swinging movement of the head axis through a limited solid angle with respect to the support, and output means for developing a signal in response to variations of the position of the head axis within said solid angle.

3. Means responsive to the direction of a fluid stream, comprising a support, a head member having a head axis and being mounted on the support for swing'ng movement of the head axis with respect to the support, vane structure on the head member for engaging a fluid stream to align the head axis with the direction of the fluid stream, said vane structure developing a torque about the head axis by virtue of relative movement of the fluid stream, bearing means interposed between the vane structure and the support to permit rotation of the vane structure with respect to the support about an axis substantially parallel to the head axis in response to said torque, electromagnetic means for developing an electrical signal corresponding to the angular position of the head axis, and means for substantially removing from said signal periodic variations having the frequency of the said rotation of the vane structure.

4. Means responsive to the direction of a fluid stream, comprising a support, a head assembly having a head axis and being mounted on the support for swinging movement of the head axis with respect to the support, the head assembly including two sets of vane means for engaging a fluid stream to align the head axis with the direction of the fluid stream, the sets of vane means being relatively rotatable in opposite directions about the head axis in response to relative movement of the fluid stream, and output means for developing a signal in response to variations of the angular position of the head axis.

References Cited by the Examiner

UNITED STATES PATENTS

| 2,662,402 | 12/53 | Ince | 73—180 |
| 2,812,898 | 11/57 | Buell | 69—39.16 |
| 2,820,363 | 1/58 | McConica | 73—189 |
| 2,896,145 | 7/59 | Snodgrass | 73—178 |
| 3,045,484 | 7/62 | Dumez | 73—180 |

FOREIGN PATENTS

| 418,377 | 10/34 | Great Britain. |
| 201,507 | 4/56 | Great Britain. |
| 840,427 | 7/60 | Great Britain. |

ISAAC LISANN, *Primary Examiner.*

LOUIS R. PRINCE, *Examiner.*